Figure 1:
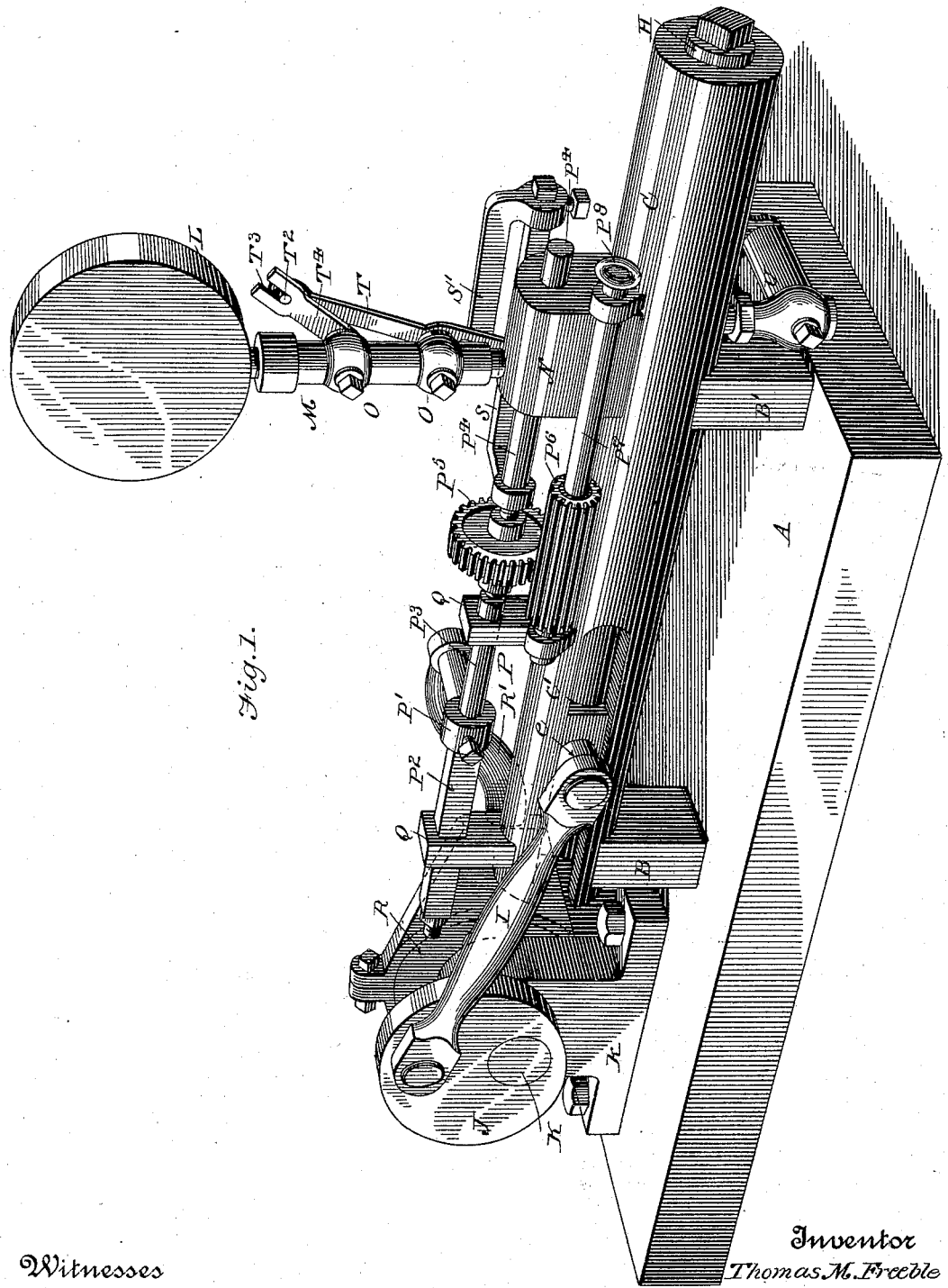

(No Model.)

T. M. FREEBLE.
POWDER MOTOR.

No. 605,445. Patented June 7, 1898.

Witnesses
Arthur Ashley
N. Wetterling

Inventor
Thomas M. Freeble
by E. M. Marble & Son
Attorneys (No Model.) 6 Sheets—Sheet 3.

T. M. FREEBLE.
POWDER MOTOR.

No. 605,445. Patented June 7, 1898.

Witnesses
Arthur Ashley
N. Wetterling

Inventor
Thomas M. Freeble
by E. M. Marble & Son
Attorneys

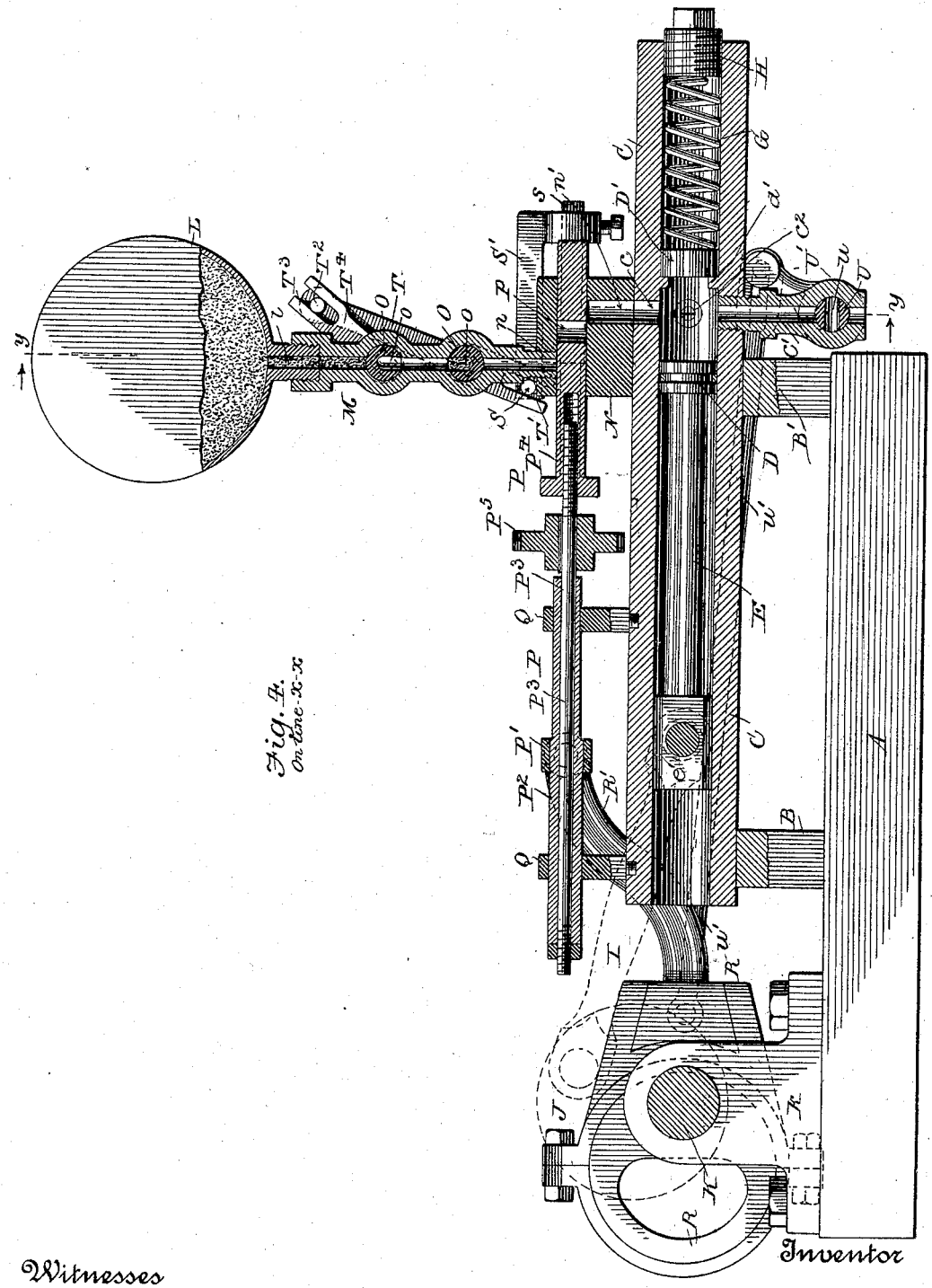

(No Model.) 6 Sheets—Sheet 5.
T. M. FREEBLE.
POWDER MOTOR.
No. 605,445. Patented June 7, 1898.
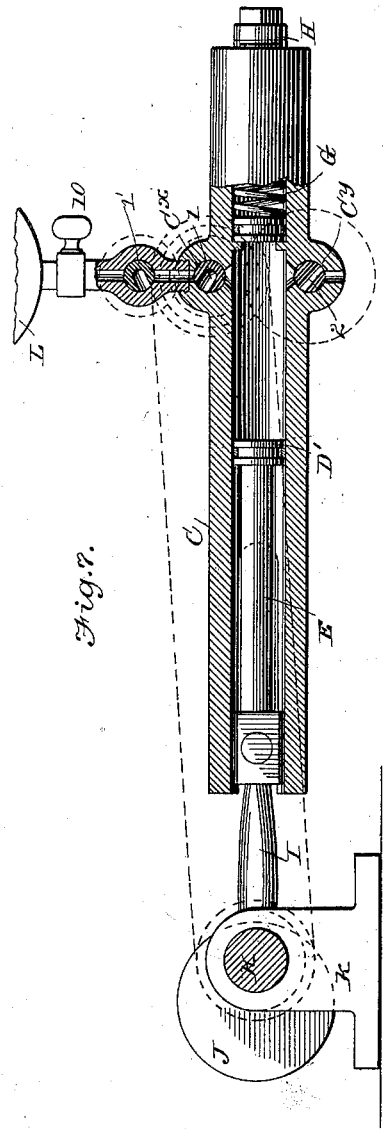
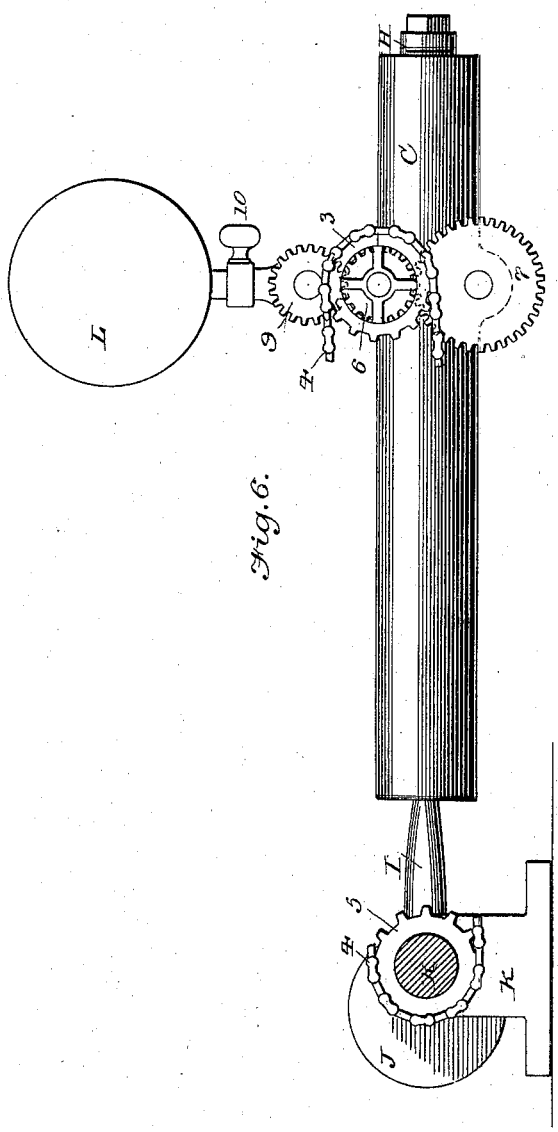
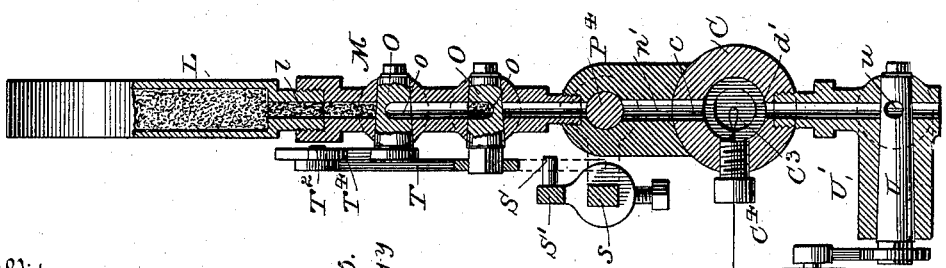
Witnesses
Arthur Ashley
N. Wetterling
Thomas M. Freeble
by E. M. Marble & Sons
Attorneys (No Model.) 6 Sheets—Sheet 6.

T. M. FREEBLE.
POWDER MOTOR.

No. 605,445. Patented June 7, 1898.

Witnesses
Arthur Ashley
N. Wetterling

Inventor:
Thomas M. Freeble
by E. M. Marble & Sons
Attys

UNITED STATES PATENT OFFICE.

THOMAS M. FREEBLE, OF LATROBE, PENNSYLVANIA, ASSIGNOR OF ONE-FOURTH TO THOMAS B. ATTERBURY, JR., OF PITTSBURG, PENNSYLVANIA.

POWDER-MOTOR.

SPECIFICATION forming part of Letters Patent No. 605,445, dated June 7, 1898.

Application filed July 14, 1897. Serial No. 644,512. (No model.)

*To all whom it may concern:*

Be it known that I, THOMAS M. FREEBLE, a citizen of the United States, residing at Latrobe, in the county of Westmoreland and State of Pennsylvania, have invented certain new and useful Improvements in Powder-Motors; and I do hereby declare the following to be a full, clear, and exact description of the invention, such as will enable others skilled in the art to which it appertains to make and use the same.

My invention relates to improvements in engines operated by the explosion of gas, powder, and other suitable explosives; and it consists in the improved powder-engine the construction and arrangement of the parts of which will be hereinafter fully described, and particularly pointed out in the claims.

The powder-machine which I have devised has been constructed with a view to, first, moderating the shock and jar of the explosion of the charges of powder, so that uniform application of the power derived from such explosions may be obtained; second, removing the waste products of combustion from the ignition-chamber and thoroughly cleansing the ignition-chamber after each explosion, so that accumulation of waste products therein or corrosion of the sides thereof is effectually prevented; third, providing feed mechanism which will successively introduce the charges of powder into the ignition-chamber, which will be capable of regulation as to the size of the charge delivered and will be simple in construction and durable in action, and, fourth, preventing accumulation of charges within the ignition-chamber in case the igniting device should fail to operate, so that hurtful explosions are prevented.

I use for a cylinder a centrally-bored tube or barrel the walls of which are of sufficient thickness to withstand the shock of the explosion of the maximum charge of powder which is to be fired therein and ignite the successive charges of powder by causing them to fall, when introduced into the ignition-chamber, upon an incandescent wire which is preferably constructed of platinum and is made incandescent by an electric current generated by a battery used in connection with the engine. The powder feed and the exhaust openings I place directly over each other in a vertical line, so that should the ignition-wire fail to operate, through a temporary stoppage of the electric current, the charges of powder would fall into the exhaust-opening and be successively removed from the ignition-chamber as uniformly as they are introduced therein. The gases produced by the explosion of the successive charges of powder act directly upon the face of the piston, which reciprocates within the bore of the cylinder and transmits its motion by a crank connection to a suitably-journaled power-shaft. To lessen the shock and violence of the explosion within the ignition-chamber, I make use of a supplemental piston which is stationed in the interior bore of the cylinder, so as to close the end of the same not occupied by the power-piston and which as the explosions occur is adapted to be forced backward within the bore of the cylinder, and to thus relieve the pressure caused by the explosions. The supplemental piston is forced back so as to form an end of the ignition-chamber by the elasticity of the air between the same and the end or head of the cylinder or by the action of a spiral spring introduced between the head of the cylinder and the piston or by other means. The effect of thus allowing the expansive force of the gases produced by the explosion of the charges of powder to be exerted in opposite directions is to moderate the violence of the explosions, while the return movement of the detached piston maintains the pressure within the ignition-chamber relatively uniform and enables the piston to travel with a steady stroke.

My invention is fully illustrated in the drawings which accompany and form a part of this specification, in which the same reference letters and numerals refer to the same or corresponding parts, and in which—

Figure 2:
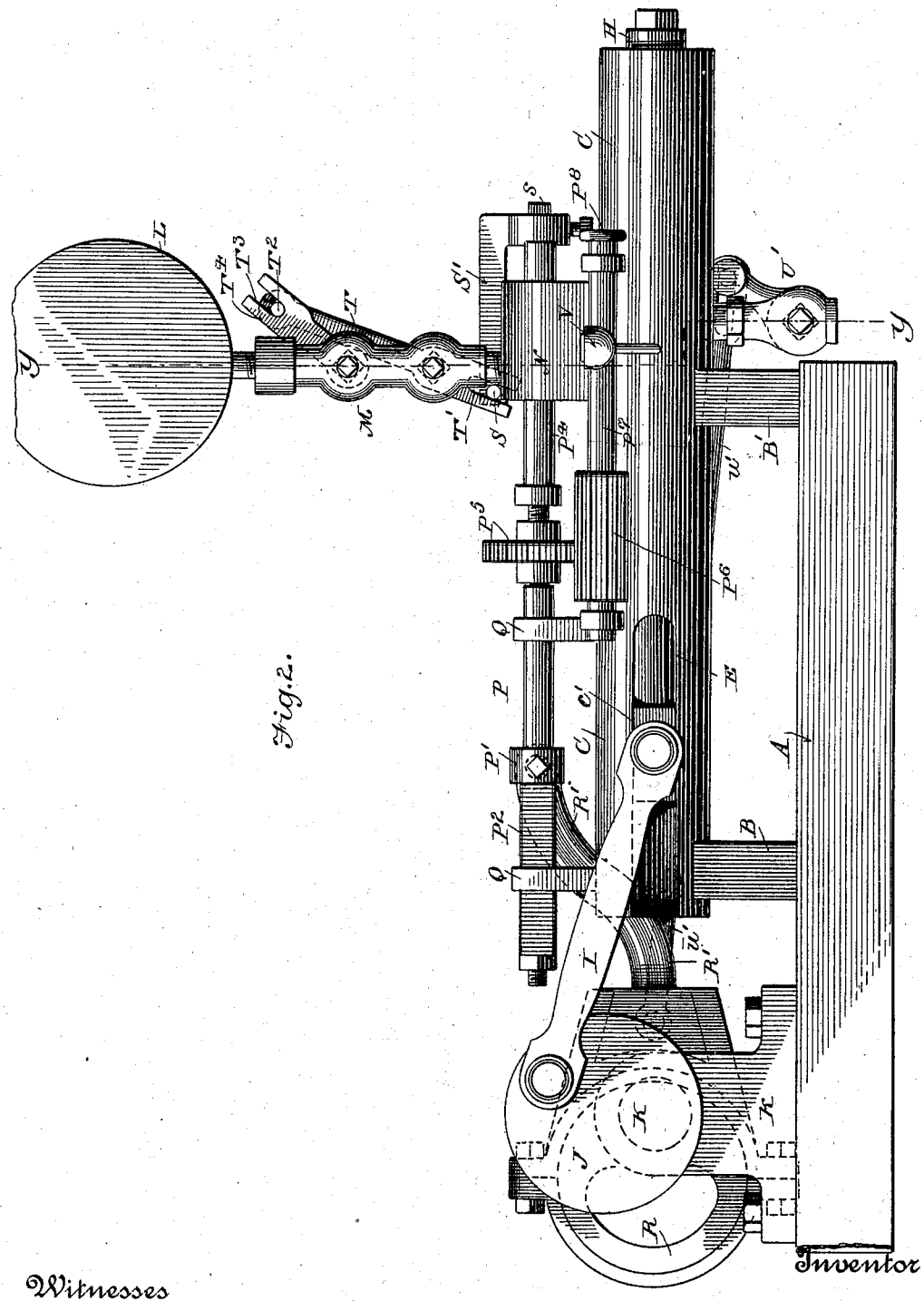
Figure 3:
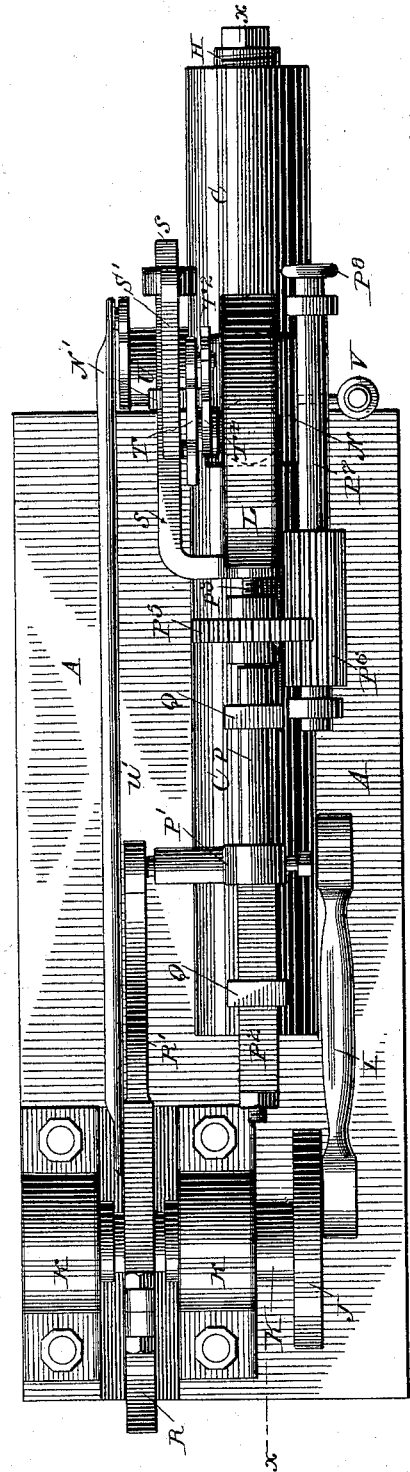
Figure 8:
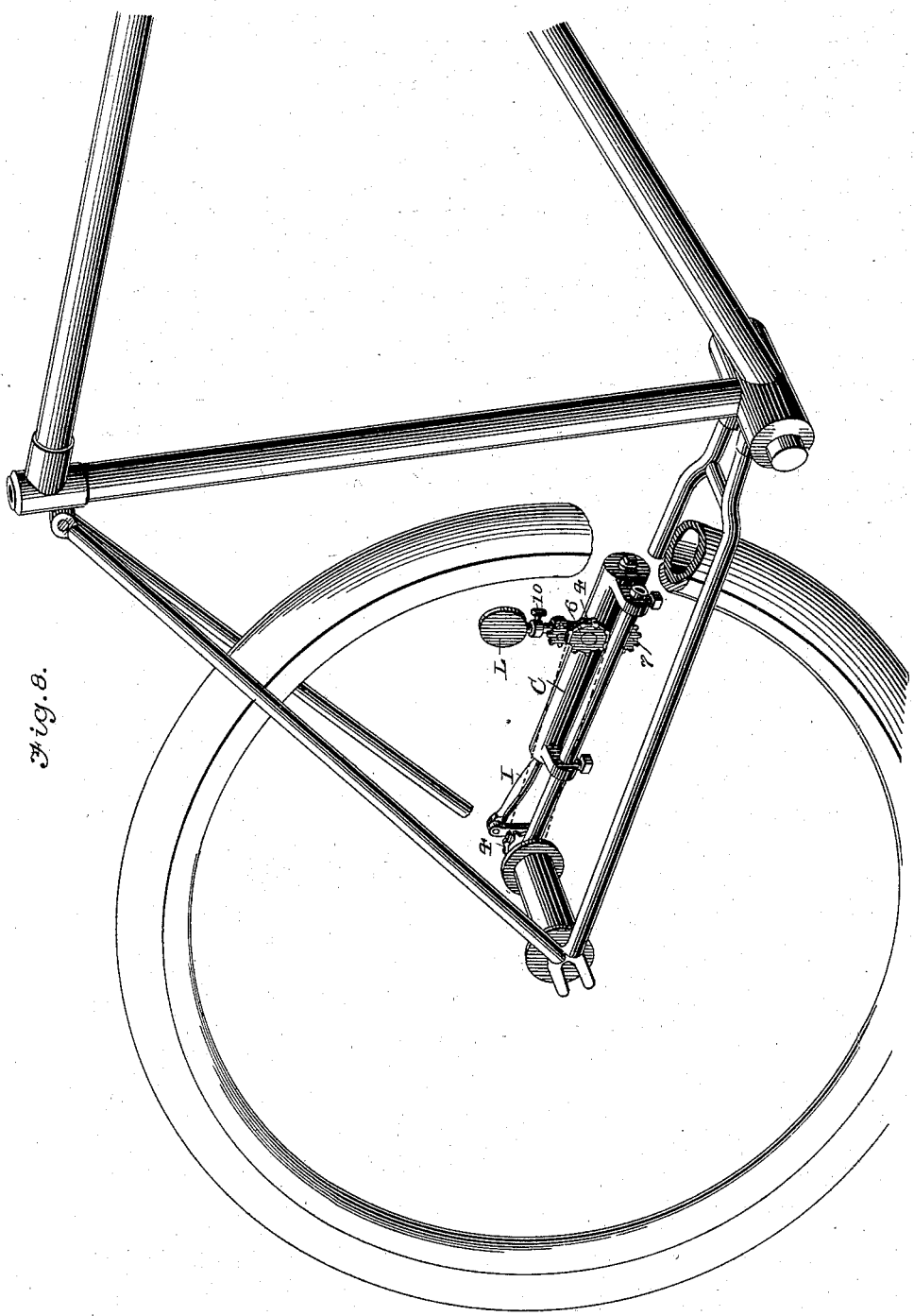

Figure 1 is a perspective view of one form of my engine. Fig. 2 is a side elevation of the same. Fig. 3 is a top plan view of the same. Fig. 4 is a central section taken on the line X X of Fig. 3. Fig. 5 is a transverse section taken on the line Y Y of Fig. 2. Fig. 6 is a view of a modified form of my engine. Fig. 7 is a central section thereof. Fig. 8 is a view of my powder-motor in position on a bicycle.

Referring to the drawings, A represents the machine-base. Upon this base are mounted blocks B and B', the upper surfaces of which are hollowed so that they serve as supports for the cylinder C, which preferably takes the form of an interiorly-bored tube or barrel, as shown, having walls sufficiently thick to withstand the shock of the explosion of the successive charges of powder introduced therein. The ignition of the charges of powder takes place within the bore of the cylinder itself, which may be lined with platinum or any other non-corrodible material, if desired. The power produced by the explosion is exerted directly against the face of the piston D.

The feeding of the charges of powder to the ignition chamber or bore of the cylinder is effected through the powder-feed opening $c$. The discharge or exhaust of the products of combustion is effected through the exhaust-opening $c'$, which is stationed in a vertical line under the powder-feed opening. The igniting device $c^2$, which takes the form in the construction shown of a short length of platinum wire $c^3$, secured to the end of the screw-threaded bolt $c^4$, which passes through an opening formed in the walls of the cylinder, is in the path through which the powder falls when introduced into the chamber. The ignition of the powder therefore follows its introduction into the chamber and takes place from the powder falling upon the platinum wire. The platinum wire is maintained incandescent by an electrical connection with a battery or other suitable source of electrical power. I preferably use a small acid battery, but other forms may be chosen. The battery, as it forms no part of this invention, is not illustrated in the drawings. I guard against the accumulation of charges of powder within the ignition-chamber in case the platinum wire should fail to ignite the charges as they are introduced therein from any accidental stopping of the electrical current by the relative position of the powder feed and exhaust openings. Since these are directly in line with each other, the charges of powder, if not ignited, will fall from the powder-feed opening into the exhaust-opening and will be removed from the chamber by the exhaust-valve mechanism in the ordinary operation of the engine. There is no possibility for an explosion within the ignition-chamber of a charge of powder greater than that which is introduced therein by a single actuation of the powder-feed mechanism, so that my powder-engine is never subjected to unusual strains and is free from danger of explosion.

Within the cylinder-chamber are located the piston D and the supplemental or detached piston D'. The two pistons are situated one on either side of the igniting device, so that they form the ends of the chamber, within which the ignition takes place. The piston D has attached to the rear face thereof or formed integrally therewith the piston-rod E, which, as shown, is made nearly as great in diameter as the piston itself, so as to prevent buckling or straining of the piston-rod during the operation of the engine. The supplemental or detached piston D' is not connected to the power mechanism, but moves freely within the cylinder bore or chamber. It is held pressed forward against the interior collar $d'$ by the action of the spiral spring G, the other end of which bears against the head H, which closes the end of the cylinder. The function of the supplemental piston is to moderate the violence or shock of the explosions within the ignition-chamber. This it does by yielding to the pressure of the gases formed by the combustion. The expansion of the ignition-chamber at both ends by the movement of the pistons which takes place avoids extreme pressure within the cylinder. As the supplemental piston D' is forced back into its forward position by the action of the spring bearing thereagainst in proportion to the moderation of the pressure of the gases produced by the explosions, the pressure within the ignition-chamber is maintained relatively constant throughout the stroke of the piston, so that the power exerted on the piston is relatively uniform. I am thus enabled to connect the piston directly with the power mechanism and to utilize the power exerted by the piston economically.

It is to be noted that the choice of the spiral spring to force the supplemental piston D' to its forward position is only one of many forms of construction which can be utilized for this purpose, and I do not limit myself to this construction. If the piston-head be made tight enough, the air-cushion existing between the piston D' and the head H will be sufficient to cause the proper action of such supplemental piston. The spiral spring is used to insure proper action of the piston.

To the piston-rod E is attached the connecting-rod I, the connection being effected through a stud, which projects from one side of the piston and reciprocates within guides formed by cutting out the wall of the cylinder. The free end of the connecting-rod I is secured to the disk J in the ordinary manner, the disk being mounted on the power-shaft K, which is supported in suitable bearings $k$, as shown. It may be here stated that a form of graphite is produced by the charges of powder by the explosions which serves as an efficient lubricant for the pistons, so that I have found it unnecessary to provide for additional lubrication thereof. The lubrication is effected automatically, as it were, by the explosions themselves, a sufficient quantity of graphite being always present to render the movement of the pistons free and to prevent loss of power.

The parts thus described are common to both styles of engines shown. The difference between the two constructions relates principally to differing forms of powder-feed mechanisms and the connections of the valves thereof to the power-shaft. I shall first describe the construction shown in Figs. 1 to 5, inclusive, and then the construction shown in Figs. 6 and 7.

The feeding of the charges of powder to the ignition-chamber in the construction shown in Figs. 1 to 5, inclusive, is effected through charge-feeding mechanism consisting of the powder-feed reservoir L, the valved feed-pipe M, and the charge-receiver N. The construction has been specially designed with a view to preventing the passage upward into the powder-reservoir of the gases produced by the explosion or of any spark which might lead to an explosion of the powder contained in said reservoir.

The powder-reservoir L may be of any desired form, but is preferably in the form of a canister, round with flat sides, and is preferably formed of thin metal, so that should an explosion occur the harm resulting therefrom would be minimized. In the bottom of the reservoir L there is formed a projecting screw-threaded boss $l$, through the opening within which the charges of powder fall into the feed-pipe M. Within the powder-feed pipe M are located two conical plug-valves O, each of which is formed with a pocket $o$ of sufficient size to receive the maximum charge of powder desired to be introduced into the ignition-chamber. The valves are further operated in a manner hereinafter described, so that powder can fall directly from the pocket of the upper valve into the pocket of the lower valve, so that when powder is being received in the upper valve it is being discharged from the lower valve. The result gained by this construction is security and freedom from passage of sparks upward into the powder-chamber in the operation of the engine. When powder is discharged from the lower valve O, the blind faces of the valve face each other, and it is impossible for any spark produced by the ignition of the powder to pass upward sufficiently far to reach the powder-reservoir.

The lower valve O discharges its charge of powder not directly into the ignition-chamber, but into the charge-receiver N. The charge-receiver N is a block of metal, preferably rounded, as shown, having formed therein an opening $n$ sufficiently large to receive the charges of powder, and with an opening $n'$ of the same size through which the powder is discharged into the powder-feed opening $c$, formed in the walls of the cylinder C. The two powder-feed openings $n$ and $n'$, formed in the charge-receiver, are located at opposite ends of the same, and powder is conveyed from one to the other by the reciprocating shaft P, which is formed with an opening $p$, adapted to receive and convey the charges of powder between the two openings. The reciprocating shaft P is guided in bearings secured to the upper face of the cylinder. Reciprocatory movement is imparted thereto through the eccentric R and the connecting-rod R', the connecting-rod R' being attached to an adjustable collar $p'$, keyed to the shaft P. It is desirable for a purpose about to be mentioned that the shaft P be formed in two portions $P^3$ and $P^4$, and that the forward end of the shaft be capable of rotary movement relative to the rear end of the shaft. Rotation of the rear end of the shaft is prevented by the squared collar $P^2$, which is keyed thereto and passes through one of the bearings Q, which bearing is correspondingly squared.

The object of providing for rotary movement of the shaft is that it enables me to regulate the size of the charge of powder introduced within the ignition-chamber. This regulation is effected in the following manner: The shaft is made in two sections $P^3$ and $P^4$, section $P^4$ screwing on the end of section $P^3$. Upon the section $P^3$ is mounted the gear-wheel $P^5$, which meshes with the toothed hub $P^6$, formed upon the longitudinally-journaled shaft $P^7$, which is secured in bearings, as shown, upon one side of the cylinder. The shaft $P^7$ is rotated by a hand-wheel $P^8$, as shown, or in any other suitable manner. It is apparent, however, that by rotating this shaft, and consequently turning the gear-wheel, the length of the reciprocating shaft P can be increased or shortened through a distance corresponding to the length of the screw-threaded connection between the two portions of said shaft. The opening $p$ in the reciprocating shaft can therefore be adjusted to come entirely under the charge-receiving opening $n$ in the charge-receiver N, in which case the full charge of powder would be conveyed to the ignition-chamber, or only a segment of the opening $p$ may be brought under the charge-receiving opening $n$, in which case the amount of charge delivered will be dependent upon the size of the segmental opening brought beneath the charge-receiving opening, or the parts may be so adjusted that the opening $p$ will not register with the charge-receiving opening $n$, in which case no charge of powder will be delivered into the ignition-chamber and the operation of the engine will cease. The capacity of the engine can thus be controlled by operating the hand-wheel $P^8$, and the engine may be started or stopped in the same manner.

The powder-feed valves O are operated through the action of the pin S, projecting from the bracket S'. The bracket S' is keyed to a supporting-rod $s$, which in the construction shown is supported upon the section $P^4$ of the reciprocating shaft P. The rod $s$ also forms a guide for the reciprocation of the shaft as it passes through the opening formed in the boss N', which projects from one side of the charge-receiver. The pin S slides within the groove T', formed within the link T, which is mounted upon the projecting end of the lower feed-valve. Upon the upper end of the link T there is formed a stud $T^2$, which slides within the groove $T^3$, formed within the link $T^4$, which is mounted upon the shaft of the upper powder-feed valve. The movement derived from this connection results in the actuation of the feed-valves in the manner hereinbefore set forth. In this construction there is at all times a double guard against the passage of sparks from the ignition-chamber to the powder-magazine and at some portions of the operation of the engine a triple guard. This secures absolute immunity from danger resulting from this source.

The exhaust-valve U is located in a valve-casing U' on the under surface of the cylinder C and in such a manner that at the proper interval the channel $u$ in the exhaust-valve U registers with the exhaust-opening $c'$, formed in the walls of the ignition-chamber. The exhaust-valve U is moved in this construction a quarter-turn by each revolution of the power-shaft, connection between the two being effected by the connecting-rod $u'$, secured to the eccentric R. The movement of the exhaust-valve is so timed that the valve-opening or channel $u$ registers with the exhaust-opening $c'$ after the explosions have taken place and after the power-piston D has been moved throughout its entire stroke. The waste gases or products of combustion are thus removed and the pressure of the gases is sufficient to cause them to carry with them the greater portion of the products of combustion.

For the successful operation of a powder-engine it is necessary to provide means for thoroughly cleansing the ignition-chamber after each explosion, so that the chamber may be entirely free from the accumulation of waste products, and so that corrosion of the sides need not take place. I effect this by introducing into the ignition-chamber after each explosion a small quantity of water, one drop or more, which I have found by experiment combines with the gases produced by the explosion in such a manner that it spreads out and thoroughly washes and cleanses the entire inner surface of the cylinder. I introduce the drops of water through a cup V and regulate the flow by any of the ordinary sight-feed constructions. Other means may be employed to effect the introduction of the water, and other liquids than water can be used.

The operation of my engine is as follows: The hand-wheel $P^8$ is first turned to allow the introduction of charges of powder into the ignition-chamber by the operation of the reciprocating shaft P, and then if the power-wheel be started, as in all momentum engines, the charges of powder will be successively fed into the ignition-chamber through the action of the powder-feed mechanism. The igniting of the powder takes place through the powder falling upon the incandescent ignition-wire $c^3$, and the gases produced by the explosion serve to force the power-piston D throughout its stroke, thus imparting power to the power-shaft K and insuring continued action of the engine. The violence of the explosion of the charges of powder within the ignition-chamber is moderated by the action of the supplemental piston D', which is forced toward the rear end of the ignition-chamber when the explosions occur by the pressure of the gases. As the supplemental piston D' is forced backward, however, into its normal or forward position by the action of the spiral spring G, the power exerted in moving the piston toward the rear end of the ignition-chamber is given back to the engine and the pressure within the ignition-chamber maintained relatively constant, thus securing an even and uniform movement of the piston. The exhaust of the gases produced by the combustion takes place through the exhaust-opening $c'$, the gases being carried away by the exhaust-valve U. The drops of water continually introduced into the ignition-chamber after each explosion serve to cleanse the ignition-chamber and to free it from waste products. The water is removed from the ignition-chamber by the exhaust, however, and so does not dampen the successive charges of powder, especially as the charges of powder do not in my construction come in contact with the walls of the chamber until after they have been exploded.

In Figs. 6 and 7 I have shown a modified form of construction. In this construction the cylinder C is formed with bosses $C^x$ and $C^y$, in which are seated the powder-feed valve 1 and the powder-exhaust valve 2, respectively. Upon the shaft of the powder-feed valve 1 is mounted a sprocket-wheel 3, which is connected with the power-shaft through the sprocket-chain 4, which passes over the sprocket-wheel 5, mounted on the power-shaft. Upon the shaft of the feed-valve is also mounted a pinion 6, which meshes with a corresponding pinion 7 on the exhaust-valve shaft and operates said valve. Pinion 8 also meshes with a corresponding pinion 9 on the shaft of the powder-feed valve 1', thus imparting power thereto. The gearing connection between the upper and lower feed-valves is such that they rotate equally, and the gearing connection between the exhaust-valve and the feed-valve is of the gearing ratio of one to two, so that with each revolution of the feed-valve the exhaust-channel $u$ of the exhaust-valve is only brought into registering position with the exhaust-opening $c'$ once. In this construction regulation of the charge of powder is effected through a cock 10, which is mounted within a boss projecting from the powder-reservoir. I do not limit myself in this construction to the means shown for operating the valve, as other suitable connections with the power-shaft can be readily devised. This construction is especially adapted for the use of my powder-engine upon bicycles, and in Fig. 8 I have illustrated my powder-motor in position on a bicycle.

My engine can be made either single, double, or compound in its action by mere duplication of the parts thereof, so that I do not limit myself to the single-acting machine shown.

I have thus illustrated two forms of my powder-engine. I do not limit myself, however, to the unessential details of construction contained in either form; but

What I claim as new, and desire to secure by Letters Patent, is—

1. In a powder-engine, the combination with a cylinder, an igniting device, and a piston or pistons to transmit the power derived from the explosion of the charges of powder, of powder feed and exhaust mechanisms, and powder feed and exhaust openings in said cylinder, said powder-feed opening being formed vertically over said exhaust-opening, whereby accumulation of successive charges in the cylinder is prevented, substantially as described.

2. In a powder-engine, the combination with a cylinder, powder feed and exhaust mechanisms, powder feed and exhaust openings in said cylinder formed in vertical line, and an igniting device, of oppositely-acting pistons within said cylinder stationed one on either side of said igniting mechanism, one of said pistons being detached or not connected with power, a piston-rod attached to one of said pistons, a crank-pin projecting therefrom, guides therefor formed by an opening in the walls of said cylinder, connection between said crank-pin and a power-shaft, a spring for normally holding said detached piston pressed forward and for returning it to its forward position after the successive explosions, and means for introducing water into said cylinder after each explosion, substantially as described.

3. In a powder-engine, the combination with a cylinder having powder feed and exhaust openings therein, said openings being placed in line with each other, powder feed and discharge valves, a power-shaft, and means for rotating said powder feed and exhaust valves from the rotation of said shaft, substantially as described.

In testimony whereof I affix my signature in presence of two witnesses.

THOMAS M. FREEBLE.

Witnesses:
L. M. MARBLE,
S. G. HOPKINS.